United States Patent [19]
Becker

[11] 3,934,415
[45] Jan. 27, 1976

[54] FLUID COUPLING WITH MOVABLE VANES

[75] Inventor: John E. Becker, Bowmanville, Canada

[73] Assignee: Cluaran Associates Ltd., Oshawa, Canada

[22] Filed: May 20, 1974

[21] Appl. No.: 471,519

Related U.S. Application Data

[63] Continuation-in-part of Ser. No. 352,971, April 20, 1973, abandoned, which is a continuation-in-part of Ser. No. 158,873, July 1, 1971, abandoned, which is a continuation-in-part of Ser. No. 81,667, Oct. 19, 1970, abandoned.

[52] U.S. Cl. .................. 60/353; 60/364; 192/3.34
[51] Int. Cl.² ........................................ F16D 33/02
[58] Field of Search ...................... 60/342, 353, 364

[56] References Cited
UNITED STATES PATENTS

| | | | |
|---|---|---|---|
| 2,073,357 | 3/1937 | Wemp | 60/353 |
| 2,270,545 | 1/1942 | Neracher | 60/353 |

*Primary Examiner*—Benjamin W. Wyche
*Attorney, Agent, or Firm*—Hirons & Rogers

[57] ABSTRACT

A fluid clutch of the kind comprising cooperating radially-vaned pump and turbine elements has at least a portion of each vane of one of the sets of vanes of the pump and turbine elements movable either by axial motion or by pivoting motion under an external operator's control within an external enclosure formed between the outside face of the respective element and an annular shell rotatable therewith. Disengagement of the clutch is effected by the said motion which withdraws the movable vanes or vane portions from the working circuit into the said external enclosure, so that the power transmitting vortices usually produced by the vanes cannot be maintained. The clutch turbine may be provided with a device which can apply some rotational friction thereto when the clutch is fully disengaged, in order to stop the turbine fully against residual fluid friction in the working circuit.

6 Claims, 6 Drawing Figures

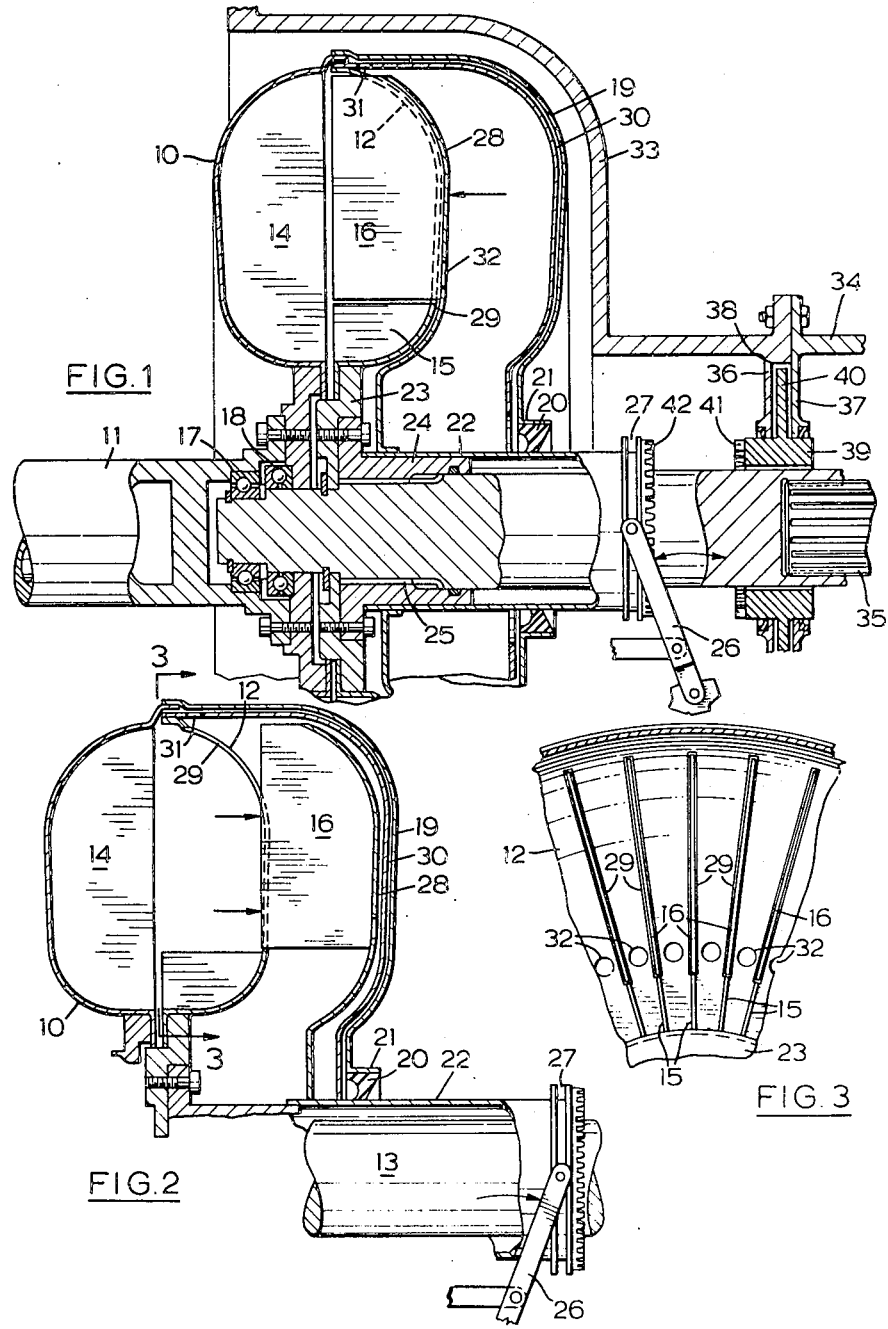

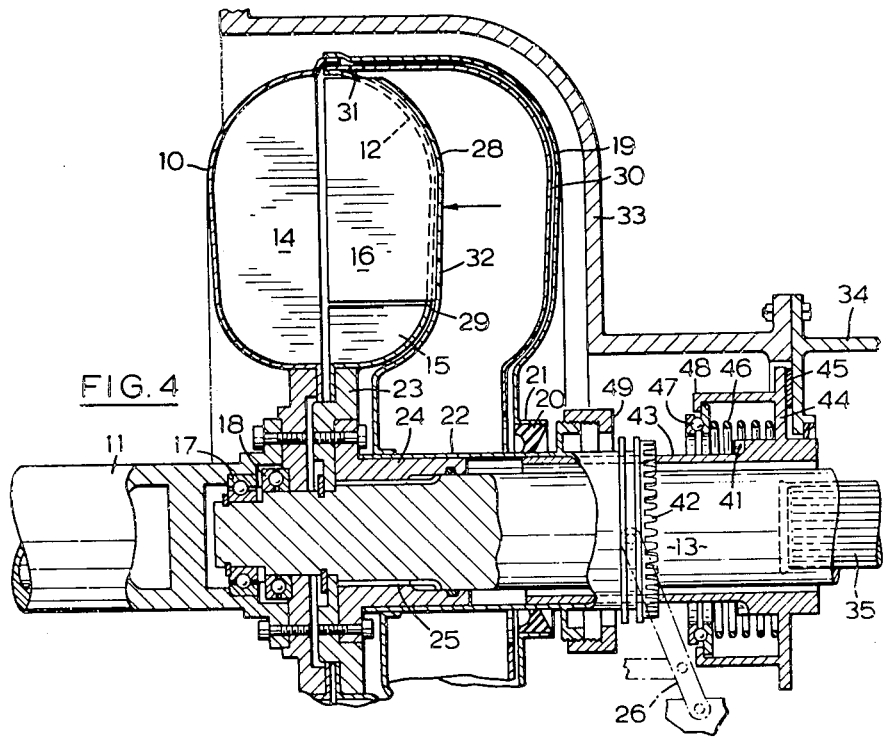

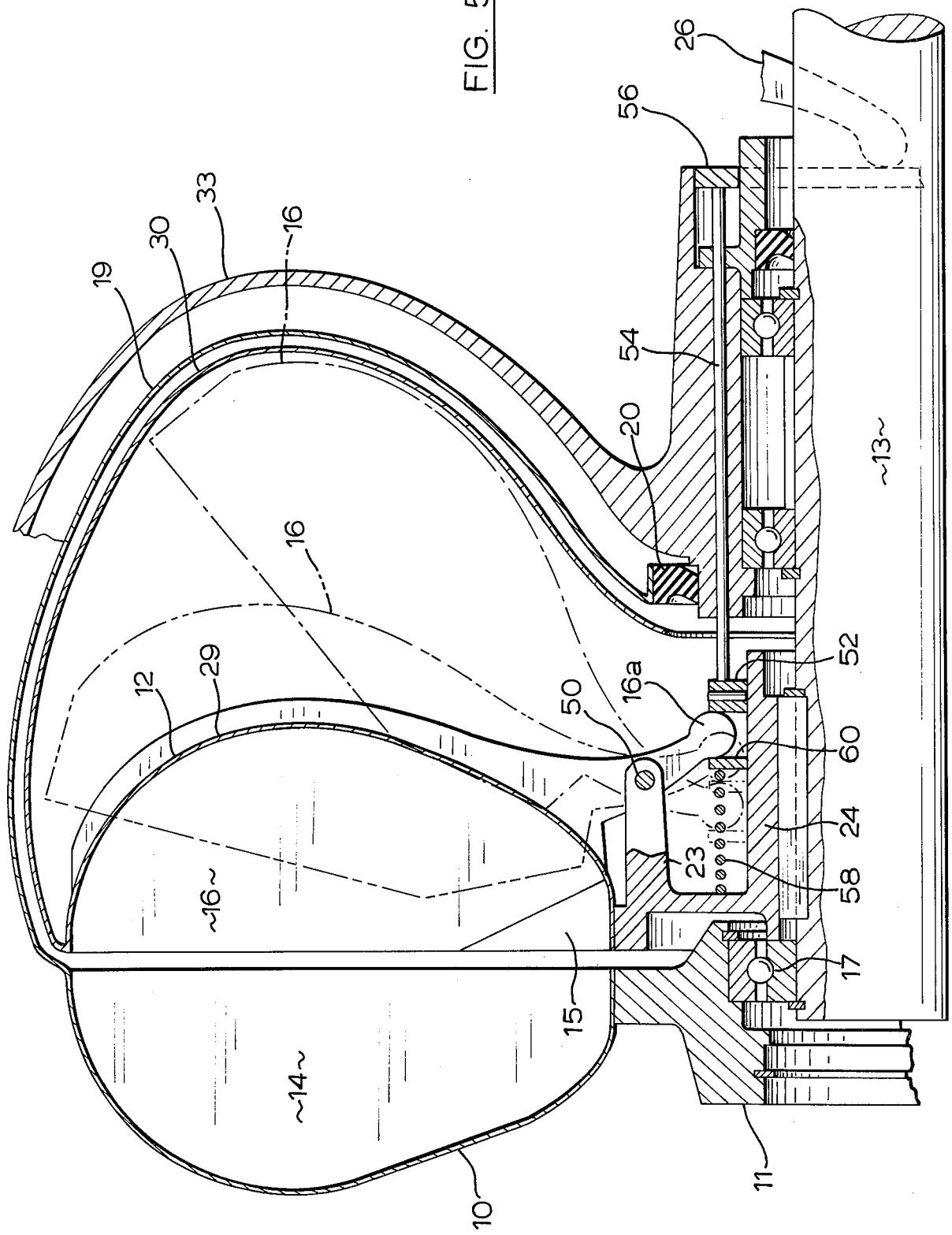

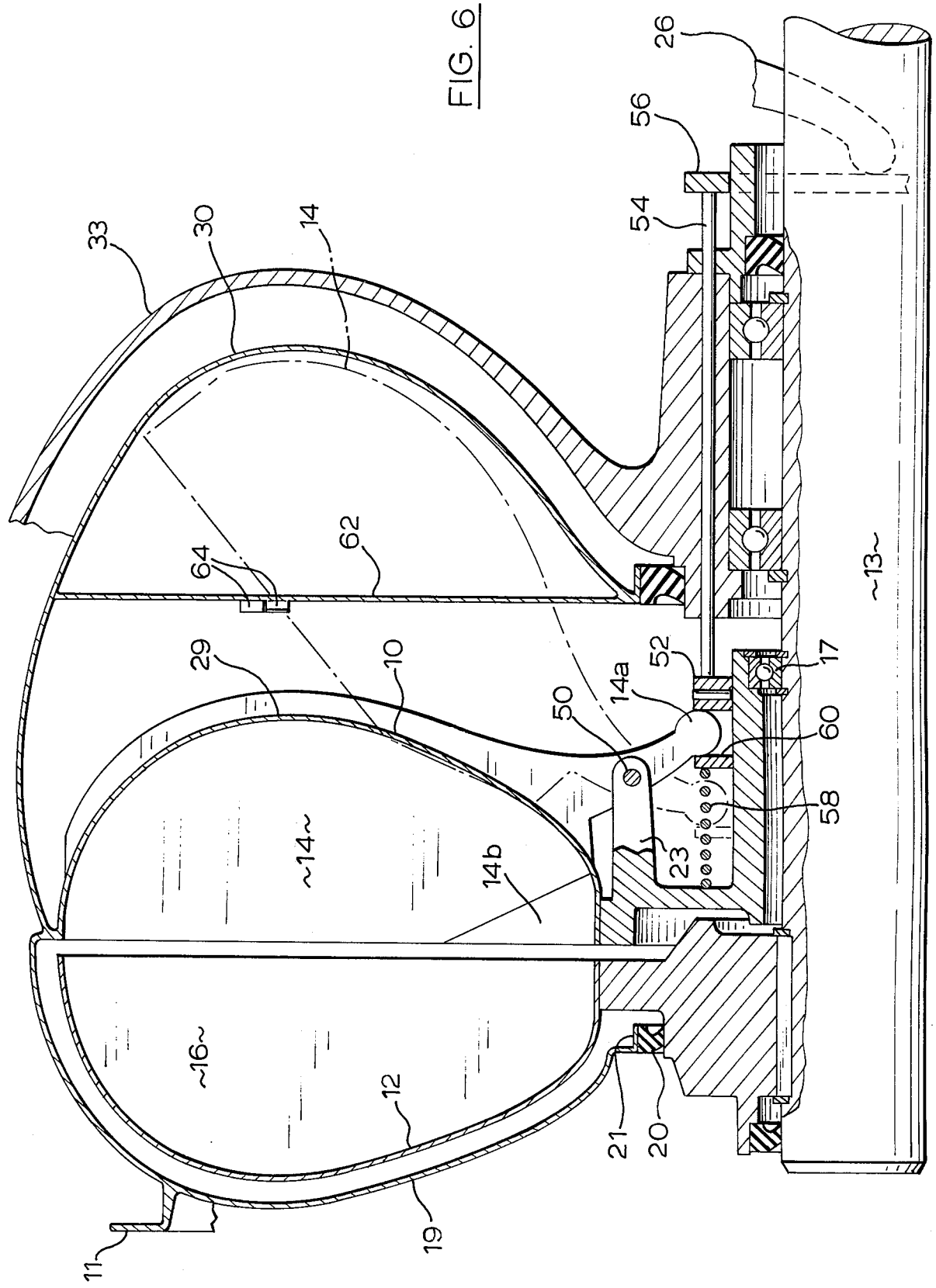

FLUID COUPLING WITH MOVABLE VANES

CROSS-REFERENCE TO RELATED APPLICATIONS

The present application is a continuation-in-part of my application Ser. No. 352,971, filed Apr. 20, 1973, now abandoned, which is a continuation-in-part of my application Ser. No. 158,873, filed July 1, 1971, now abandoned, which is in turn a continuation-in-part of my application Ser. No. 81,667, filed Oct. 19, 1970, now abandoned.

FIELD OF THE INVENTION

The present invention is concerned with improvements in or relating to fluid clutches, of the kind comprising cooperating radially-vaned pump and turbine elements which are rotatable relative to one another and in which power is transmitted between the elements by liquid vortices established between them.

REVIEW OF THE PRIOR ART

Fluid clutches of the kind specified are usually provided in a drive system between a load and a prime mover, and provision must be made for engagement and disengagement thereof under the control of an operator.

Examples of fluid couplings to which the present invention is applicable and which are provided with additional overload protection and/or are arranged for smooth analogising control of the power transmission capacity are described, for example in my prior U.S. Pat. Nos. 3,045,429 and 3,237,409.

There has been proposed in U.S. Pat. No. 2,270,545, issued Jan. 20, 1942 to Chrysler Corporation, a fluid coupling drive device comprising cooperating relatively rotatable vane-carrying pump and turbine structures. A third structure comprises a slotted annular structure resting within one of the first-mentioned structures, so that the vanes of the said one structure can move axially in the slots for engagement and disengagement of the coupling device. In the disengaged position the working fluid, which is caused to rotate by the pump vanes and the corresponding pump structure, can engage the withdrawn portions of the vanes and exerts a considerable torque thereon. This torque causes a large drag on the output shaft, preventing complete declutching of the device.

DEFINITION OF THE INVENTION

It is an object of the present invention to provide a new fluid clutch employing axially movable vanes for control of engagement and disengagement thereof.

It is a more specific object to provide a new fluid clutch as specified in the preceding paragraph and particularly suitable for application to a change speed gear.

In accordance with the present invention there is provided a fluid clutch of the kind specified comprising power input and output means, a pump element and a turbine element connected respectively to the power input and power output means for rotation thereby and providing respectively cooperating pump and turbine chambers rotatable about the same axis and constituting a working chamber, a quantity of working liquid in the working chamber, each element comprising a respective annular element shell and a respective set of radially-extending vortex producing vanes, the pump element having an axial extension thereof surrounding the turbine element shell to form a compartment between the extension and the turbine element shell, the turbine element comprising another annular shell fixed thereto, disposed within the said compartment, axially spaced from and rotatable with the turbine element shell to form a corresponding enclosure of constant volume therebetween, at least a portion of some of the vanes of said turbine element being movable axially through slots formed in the wall of the turbine element shell out of and into the turbine element chamber and respectively into and out of the last-mentioned constant volume enclosure for movement of the movable vanes or vane portions into and out of vortex-producing operative cooperation with the vanes of the pump element, and means operatively connected to the said movable vanes or vane portions for moving them through the slots from a clutch-engaged position in the turbine element chamber in which the pump and turbine vanes cooperate to produce power-transmitting vortices, to a clutch-disengaged position in which the pump and turbine vanes cannot cooperate to produce such vortices.

DESCRIPTION OF THE DRAWINGS

Fluid clutches which are specific embodiments of the invention will now be described, by way of example, with reference to the accompanying diagrammatic drawings, wherein:

FIG. 1 illustrates a first embodiment in which vane portions of the turbine element are moved axially, the FIGURE being a longitudinal cross-section in a plane containing the common rotational axis of the two coupling elements, and showing the clutch in engaged condition, FIG. 2 is a similar view to FIG. 1 of part of the clutch of FIG. 1, and showing the clutch in disengaged condition, FIG. 3 is a partial end view to show a detail of the vanes of one of the clutch elements, FIG. 4 is a view similar to FIG. 1 and illustrating a clutch with another form of device for applying rotational friction to the clutch turbine, FIG. 5 is a view similar to FIG. 1 and illustrating another form of clutch in which the turbine vanes are moved pivotally to engage and disengage the clutch, and FIG. 6 is a view similar to FIG. 5 and illustrating a clutch in which the pump vanes are moved pivotally.

Similar parts are given the same reference in all the Figures of the drawing.

DESCRIPTION OF THE PREFERRED EMBODIMENTS

The clutch particularly illustrated herein comprises a pump element 10 connected to a power input shaft 11 that is in turn adapted to be connected to a prime mover, and a turbine element 12 connected to a power output shaft 13 that is in turn adapted to be connected to apparatus to be driven via the clutch. The pump and turbine interior together form the conventional toroidal-shaped working chamber. The pump interior is provided with the conventional fixed radially-extending vanes 14 while the turbine chamber is provided at its radially-inner end with fixed vane portions 15, each vane portion 15 being operatively associated with a respective movable vane portion 16. The cross-section of the toroidal working chamber in a plane containing the axes of the shafts 11 and 13 is an ellipse of relatively large eccentricity with the major axis thereof perpendicular to the shaft axes and the minor axes thereof parallel thereto. In this embodiment the immediately adjacent inner ends of the the two shafts 11 and 13 are mutually supported by a ball bearing 17, and a thrust bearing 18. An extension 19 of the pump element surrounds the turbine element in known manner to retain the working liquid in the coupling, a rotatable, fluid-tight joint 20 being provided between the radially-inner end 21 of the said extension 19 and an axially-movable tubular sleeve 22 to be described below.

The fixed vane portions 15 are mounted on a boss 23 fastened by bolts to a sleeve 24 surrounding the shaft 13 and rotatably connected thereto by splines 25. The above-described sleeve 22 is mounted around the sleeve 24 and can slide freely axially thereon under the control of an operator's handle 26, one end of the handle being engaged in a circular groove 27 at the end of the sleeve 22.

An annular shell 28 of a shape to fit closely around the adjacent annular shell of the turbine element 12 is fastened at its radially inner end to the sleeve 22 to be movable therewith. Each of the movable vane portions 16 is a close sliding fit in a respective slot 29 in the turbine element shell 12 and is fastened along the respective edge to the shell 28, so that the said vane portions are movable axially simultaneously with one another by operation of the handle 26. An annular shell 30 of a shape to extend with good clearance around the inner wall of the extension 19 is fastened to the shell 12 at their respective radially outermost ends.

In operation with the movable vane portions in the position shown in FIG. 1 normal liquid vortices are established in the working chamber and transmit power between the pump and turbine elements. As the operator moves the handle 26 to move the vane portions 16 toward the position shown in FIG. 2, less and less of the vanes are exposed to the action of the vortices and the power transmission capacity of the clutch is reduced progressively. At some point in the axial movement the vortices will collapse completely and the clutch is effectively disengaged. In this condition the working fluid gathers as an annulus at the radially-outermost part of the interior of the shell 28. The shell is provided with a circle of holes 32, spaced equidistantly from the axis of the coupling, which permits the working fluid to pass quickly and without resistance to the space between the shells 28 and 30, facilitating axial movement of the shell 28. In the absence of the holes 32 the fluid would find its way relatively slowly into the said space through the holes 31, causing great resistance to the axial movement.

Upon axial movement of the shell 28 and the vane portions toward the position shown in FIG. 1, at some point the vortices will become re-established and the clutch will become effectively engaged. As is usual with a clutch, the movable portion may be spring urged for engagement so that disengagement takes place against the action of the spring with automatic engagement upon release of the handle 26. Such spring means are well known in the art and are not illustrated.

The important function performed by the shell 30 is best explained by assuming that it is absent with the movable vanes in the withdrawn position and the turbine stopped. The mass of working liquid is rotated vigorously by the fixed pump vanes. Liquid present in the space between the shell 12 and extension 19 is carried along by friction with the inner wall of the extension. The turbine is therefore subjected to forces caused by the friction of the working liquid against its interior face, while the withdrawn vanes are subjected to forces from the rotating liquid in the said space. As will be seen from FIG. 2 there is a large opening through which this liquid can easily reach the vanes. The result is that a very large braking force would be required to hold the turbine stationary.

With the shell 30 present it encloses the withdrawn vanes and protects them from impingement by the liquid between the shell 12 and the extension 19. The amount of braking required consequently is considerably reduced, reducing the size of brake that must be provided. Moreover, there is no undesirable heating of the working fluid when the clutch is disengaged and the engine is running, owing to interaction within the working liquid and between the liquid and the parts of the clutch.

In the embodiment illustrated, the turbine vanes are divided into minor fixed and major movable portions, but in other embodiments all of the turbine vanes may be movable. The provision of the minor fixed portions does simplify the construction of the turbine element, since they add structural strength to the shell 12. Fixed minor portions may be provided at the radially-outer end, or at both ends, or elsewhere along the element, as long as the radial area thereof is not sufficient to maintain the vortices with the movable vane portions fully withdrawn. The pump vanes may instead, or in addition, be made axially movable, and may have one or more fixed portions, as described for the turbine vanes. In this embodiment all of the turbine element vanes have a portion which is movable, but it is envisaged that in some constructions some of the vanes in a set with movable portions do not themselves have movable portions, provided that such vanes are sufficiently spaced apart that the desired reduction and collapse of the vortices is obtained upon withdrawal of the movable portions.

It will be seen that the operation of the clutch for engagement and disengagement is effective for either direction of rotation and irrespective of the element carrying the movable vane portions. The engaging means of the clutch do not have to be held against the axial force operative between the pump and the turbine, and this pressure is taken by the turbine element shell 12 against the shaft shoulder provided for that purpose; also there is no engaging pressure on the turbine element shell 30. There is a force between the turbine element shell 12 and the movable vane portions when disengaging, but this is low and lasts for only a short time. There is only low drag when the clutch is disengaged since the withdrawn vanes are shielded from the circulating fluid by the shell 30.

A common application for such a clutch is in a vehicle between a prime mover connected to the pump shaft 11 and a change-speed gear connected to the turbine shaft 13, and the above-mentioned drag on the turbine produced by the annulus of fluid in the working chamber may cause difficulty in obtaining optimum shifting of the gear while the vehicle is at rest, owing to the consequent rotation of the gear input shaft. In the embodiment of FIGS. 1 to 3 this difficulty is avoided by the addition of a device providing rotating frictional drag to the turbine when required in the gear-shifting operation.

An external casing for the clutch is indicated by the reference 33, this casing being connected to a gear casing 34, while a gear shaft 35 is connected by splines to the shaft 13. The adjacent ends of the casings 33 and 34 are provided with respective axially-spaced radial partitions 36 and 37 forming an annular chamber 38 filled with a viscous liquid, such as a silicone oil. A rotor comprises a boss 39 mounted on the shaft 13 for free rotation thereon, with a radially-extending disc 40 extending into the chamber 38, the boss face nearer to the clutch being provided with a ring of clutch teeth 41 engageable with a cooperating ring 42 on the sleeve 22.

The turbine should not be stopped when gear changing while the vehicle is moving, and the clutch can therefore be moved to the fully disengaged position without engaging the teeth 41 and 42. If however, the vehicle is stopped then the clutch control handle 26 is moved further to the right as seen in the figure, whereupon the rotor 39 rotates with the turbine, braking the rotor by the frictional drag with the viscous liquid and causing it to stop. The viscosity is made such that at the most the turbine will turn only slowly with the pump at its maximum speed. The additional movement of the handle 26 required to cause engagement of the teeth may take place against the urge of a spring device (not shown) so that the operator will be made aware of the position of the handle and must take positive action to obtain the desired effect.

In the embodiment of FIG. 4 another form of device is shown which will produce the desired rotating frictional drag. An auxiliary sleeve 43 is mounted around the shaft 13 and extends into the sleeve 22, the sleeve 43 having a radially-extending disc 44 carrying an annulus 45 of friction material that is engageable with a corresponding face of the casing 34. A helical spring 46 urges a thrust bearing 47 against a cylindrical stop member 48 connected to the disc 44, the bearing 47 being engageable by an axially-adjustable member 49 fastened to the sleeve 22.

As with the embodiment of FIG. 1 the clutch can be fully disengaged without engagement of the teeth 41 and 42. Further movement of the sleeve 22 to the right engages the member 49 with the bearing 47, whereupon the spring is operative to urge the friction material 45 against the casing 34, while the teeth have engaged and the friction thereby provided is applied to the turbine.

In the embodiments of FIGS. 5 and 6 the movable vanes are moved into and out of the working chamber by pivoting about an axis close to the respective shaft; in the embodiment of FIG. 5 it is the turbine vanes 14 which are so mounted, while in the embodiment of FIG. 6 it is the pump vanes that are movable. Thus each movable vane 14 (FIG. 5) or 16 (FIG. 6) is mounted by pivot pin 50 to the part 23 of the respective element boss and has a tail portion 16a and 14a respectively engaged by a thrust bearing 52 that is movable axially on the boss part 23 under the action of a plurality of circumferentially spaced push rods 54, that are in turn pushed by a ring 56 engaged by the handle 26. The vanes are urged to the clutch engaged position within the respective element working chamber by a compression spring 58 that is operative on the vane tails 16a or 14a via a thrust washer 60.

In the embodiment of FIG. 5 small fixed turbine vane portions 15 are provided to reinforce the shell 29 and the shell 30 extends parallel to pump shell extension 19, while in the embodiment of FIG. 6 fixed pump reinforcing vane portions 14b are provided and the shell 30 extends parallel to outer casing 33. As illustrated in FIG. 6 a radially-extending vane support member 62 may be provided in the space between the respective element shell and the shell 30, the member having a plurality of radial slots into each of which a respective one of the vanes enters as it pivots to its withdrawn position, so as to provide additional support thereto while they are in this position. Guide tabs 64 may be struck out or otherwise provided on the support member to guide the vanes into the slots as they move outwards. A brake is not illustrated for the embodiments of FIG. 5 and 6, but the manner in which this can be provided will be apparent to those skilled in the art.

I claim:

1. A fluid clutch of the kind specified comprising power input and output means (11, 13), a pump element (10) and a turbine element (12) connected respectively to the power input and power output means for rotation thereby and providing respectively cooperating pump and turbine chambers rotatable about the same axis and constituting a working chamber, a quantity of working liquid in the working chamber, each element comprising a respective annular element shell (10, 12) and a respective set of radially-extending vortex producing vanes (14, 16), the pump element having an axial extension (19) thereof surrounding the turbine element shell to form a compartment between the extension and the turbine element shell, the turbine element comprising another annular shell (30) fixed thereto, disposed within the said compartment axially spaced from and rotatable with the turbine element shell to form a corresponding enclosure of constant volume therebetween, at least a portion of some of the vanes of said turbine element being movable axially through slots formed in the wall of the respective turbine element shell out of and into the turbine element chamber and respectively into and out of the last-mentioned constant volume enclosure for movement of the movable vanes or vane portions into and out of vortex-producing operative cooperation with the vanes of the pump element, and means operatively connected to the said movable vanes or vane portions for moving them through the slots from a clutch-engaged position in the turbine element chamber in which the pump and turbine vanes cooperate to produce power-transmitting vortices, to a clutch-disengaged position in which the pump and turbine vanes cannot cooperate to produce such vortices.

2. A clutch as claimed in claim 1, wherein the turbine element vanes or vane portions are movable axially thereof and are connected together for simultaneous movement by a respective member (28) which is mounted within the said enclosure for the corresponding movement thereof.

3. A clutch as claimed in claim 1, wherein each movable turbine element vane or vane portions is fastened to an annular shell member (28) constituting connecting means therefor and mounted for axial movement within the said enclosure toward and away from the slotted turbine element wall.

4. A clutch as claimed in claim 3, wherein the annular shell member constituting the connecting means is mounted on an axially-movable sleeve carried by a shaft on which the turbine element is mounted.

5. A clutch as claimed in claim 1, wherein a plurality of apertures (31) are provided in the radially-outermost part of the said another annular shell to return working fluid trapped within the said enclosure to the clutch working chamber.

6. A clutch as claimed in claim 1, wherein a plurality of apertures (32) are provided in the wall of the annular turbine element shell to permit fluid to pass from one side of the shell to the other as the movable vanes or vane portions respectively are moved through the slots in the wall thereof.

* * * * *